United States Patent [19]
Martin

[11] 4,129,474
[45] Dec. 12, 1978

[54] RETREADING OF TIRES
[75] Inventor: Aubrey W. Martin, Heilbron, South Africa
[73] Assignee: Republic Rubber Industries (Prop.) Ltd., Heilbron, South Africa
[21] Appl. No.: 765,044
[22] Filed: Feb. 2, 1977
[30] Foreign Application Priority Data
  Feb. 27, 1976 [ZA] South Africa .................. 76/1179
[51] Int. Cl.² ........................................... B29H 17/36
[52] U.S. Cl. .................. 156/394; 150/54 B; 156/96; 157/1.35; 301/10 R; 301/14; 301/17; 301/22
[58] Field of Search ............... 156/96, 128 R, 394 R, 156/394 FM; 425/11, 17, 36; 144/309 S, 288 A; 157/1.1, 1.35; 301/9, 10, 11, 14, 17, 22, 26; 150/54 R, 54 B

[56] References Cited
U.S. PATENT DOCUMENTS

| | | | |
|---|---|---|---|
| 2,480,578 | 8/1949 | Hodges | 425/17 |
| 3,133,317 | 5/1964 | Branick | 425/17 |
| 3,236,709 | 2/1966 | Carver | 156/96 |
| 3,593,764 | 7/1971 | Smith | 425/17 |
| 3,730,801 | 5/1973 | Martin | 156/96 |
| 3,745,084 | 7/1973 | Schelkmann | 156/96 |
| 3,752,726 | 8/1973 | Barefoot | 156/394 FM |
| 3,802,978 | 4/1974 | Barnett | 156/96 |
| 3,884,740 | 5/1975 | Schelkmann | 156/96 |
| 3,986,916 | 10/1976 | Marangoni | 156/394 |

*Primary Examiner*—John E. Kittle
*Attorney, Agent, or Firm*—Olson, Trexler, Wolters, Bushnell & Fosse, Ltd.

[57] ABSTRACT

The invention provides for the retreading of tires in which the tire casing is stressed by fluid pressure inside the casing so that the casing is in a stressed condition when a new tread is applied thereto. The tire casing is stressed by positioning it on a rim and providing fluid pressure in the cavity between the rim and the casing with or without employing an expandible tube in the cavity.

14 Claims, 12 Drawing Figures

U.S. Patent  Dec. 12, 1978  Sheet 3 of 4  4,129,474
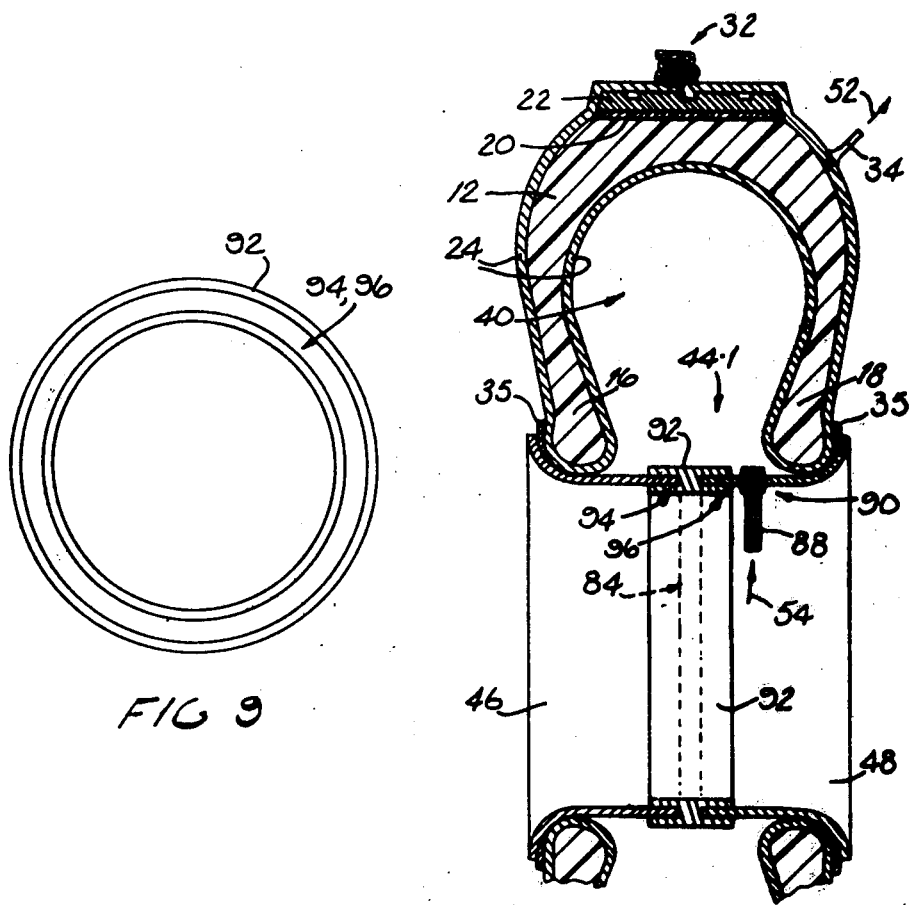
FIG 9
FIG 8
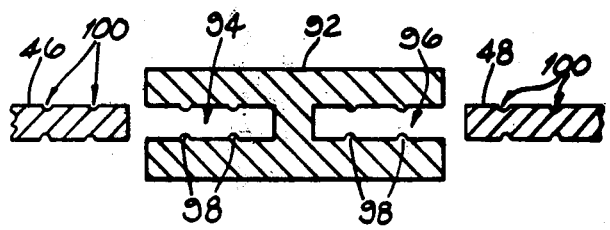
FIG 10

RETREADING OF TIRES

BACKGROUND TO THE INVENTION

This invention relates to the retreading of tires. The invention relates in particular to a method of and apparatus for the retreading of tires, and to tires retreaded in accordance with the method of the invention.

According to the invention there is provided a method of retreading tires, the method including the steps of positioning a tread over the tread zone of a tire casing with a bonding material interposed between the tread and the tire casing, enclosing the assembly of tread and tire casing inside a flexible envelope with the envelope covering the external surface of the tyre casing and tread assembly as well as the internal surface of the tire casing, positioning the assembly of tire casing and envelope on a rim, forcing the envelope against the tread and the tire casing, and stressing the tire casing by fluid pressure in the annular cavity defined between the rim and the assembly of tire casing and envelope so that the tread zone is in a stressed condition when the tread is being bonded thereto.

The fluid pressure in the annular cavity may be provided by a gas under pressure.

A fluid may be introduced at ambient temperature under pressure into the annular cavity and the temperature of the fluid may then be raised to thereby cause an increase in the fluid pressure in the cavity.

The envelope may be forced against the tread and the tire casing by sucking out air from the space between the envelope and tread and tire casing. Alternatively, or in addition, fluid pressure higher than atmospheric pressure is applied to the external surface of the envelope.

Conveniently, the air may be sucked out from the envelope prior to fluid pressurisation of the annular cavity.

The method may include providing an expandible tube inside the cavity and providing fluid pressure inside the tube to thereby pressurize the cavity and thus to expand the tire casing. The expandible tube may be fast with the flexible envelope and in at least a part of the flexible envelope covering the internal surface of the tire casing may form a part of the expandible tube.

In an alternative arrangement the stressing of the tire casing by fluid pressure in the annular cavity may be effected without employing a tube in the annular cavity.

The invention also extends to tires whenever retreaded by the method in accordance with the invention.

Further according to the invention there is provided tire retreading apparatus including a flexible envelope which can totally enclose the assembly of a tire casing and a tread positioned on the tread zone of the tire casing so that the envelope covers the internal and the external surfaces of the assembly, a tubular rim on which a tire casing enclosed in the envelope is locatable so that the tire is axially restrained on the rim and so that an annular cavity is defined between the rim and the tire casing enclosed in the envelope located on the rim, the annular cavity being capable of being pressurized by fluid pressure to force the envelope against the internal surface of the tire casing to thereby stress the tire casing.

The rim may be a composite structure comprising two tubular parts which are axially releasably attachable to one another. One end of each rim part be flared out and may form a shoulder engageable with the bead region of a tire casing for axial restraint of the tire casing on the rim.

Conveniently, the rim parts may have releasably lockably interengageable formations. The formations on one rim part may comprise hooks and the formations on the other rim part may comprise projecting studs which are engageable by the hooks by relative rotational movement of the rim parts with respect to one another. Conveniently, the formations are provided on the interior tubular surfaces of the rim parts.

The releasably lockably interengageable formations may maintain the rim parts with an axial spacing between them when the formations are locked together.

There may be provided a seal which is adapted to seal the axial joint between the rim parts in a fluid tight manner when they are in an operative position. Conveniently, the seal is an annulus of a resilient material and has a cross-sectional profile of H-shape which is engageable with the rim parts. The seal and the rim parts may have complementary interengageable formations to improve the sealing of the surfaces of contact between the rim parts and the seal.

In one embodiment of the apparatus, the annular cavity may be capable of being pressurized by fluid pressure without employing a tube in the annular cavity, there being provided a valve in the rim to introduce fluid pressure through the rim into the annular cavity.

In an alternative embodiment, the apparatus may include an expandible tube which is positionable in the annular cavity and is expandible by fluid pressure to thereby pressurise the cavity and stress the tire casing. The tube may be an annulus of an elastic material which is expandible by being inflatable by a gas under pressure. In a particular arrangement, the expandible tube may be fast with the flexible envelope and at least a part of the flexible envelope covering the internal surface of the tire casing may form a part of the expandible tube.

The flexible envelope may be strengthened in the region where it contacts the marginal axial regions of the rim. The strengthening may be by means of a strip of material which is adhesively secured to the envelope. If desired, the strip of material may be reinforced.

The expandible tube may have a tubular projection through which the tube can be inflated, and the rim may have an aperture through which the tubular projection can project.

The invention will now be described by way of examples with reference to the accompanying drawings, in which:

FIG. 8 shows a cross-sectional view of a retreading apparatus similar to that shown in FIG. 2 but including the composite rim shown in FIG. 7 instead of that shown in FIG. 3, and excluding an expandible tube;

FIG. 9 shows a side view, on a slightly enlarged scale, of the seal on the rim shown in FIG. 8;

FIG. 10 shows on an enlarged scale an exploded fragmentary view of the seal and rim parts shown in FIG. 8;

Figure 1:
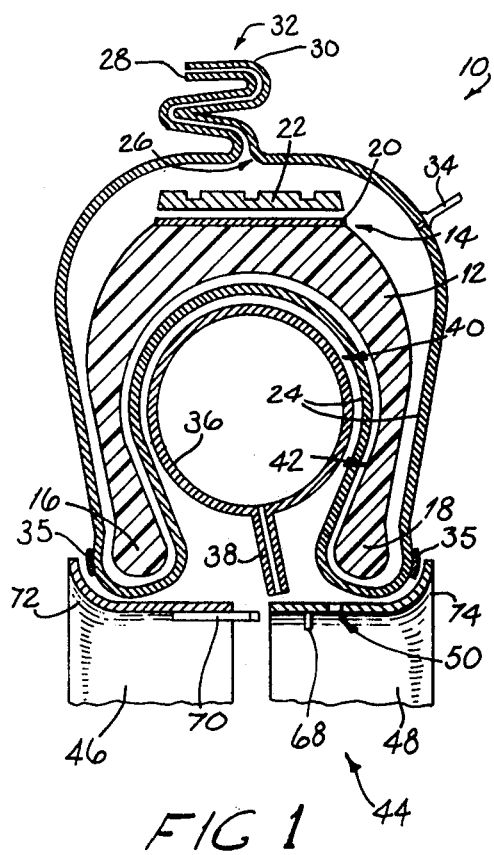
FIG. 1 shows a cross-sectional view of the initial stages of the assembly of an apparatus in accordance with the invention for carrying out a method of retreading in accordance with the invention.

Referring to FIG. 1, reference numeral 10 indicates in general an assembly of parts employed in a method of retreading tires in accordance with the invention. The tire to be retreaded is indicated by reference numeral 12, and it has a tread zone 14 and two beads 16 and 18.

In the method of retreading the tread zone 14 is prepared by buffing or the like, and a bonding material 20 is applied thereto. A tread 22 is applied to the bonding material 20, and the combination of tire casing 12 with the tread 22 applied thereto is of an elastic material such as rubber, natural or synthetic, and has a peripheral slit 26 defined between overlapping regions 28 and 30. The overlapping regions 28 and 30 are interfolded within each other a plurality of times to form an air-tight seal 32. As is shown in FIG. 1, the envelope 24 totally enclosed the combination of tire casing 12 and tread 22 so that in the more advanced stage shown in FIG. 2, the envelope is contiguous with the internal and external surfaces of the tire casing and tread combination 12 and 22. The envelope 24 has a one-way valve 34 through which air may be sucked from the inside of the envelope. Annular strips 35 of reinforcing material, e.g., of synthetic fibres or of rubber, are bonded to the exterior surface of the flexible envelope 24 in the regions of the envelope abutting the flared ends 72 and 74 of the rim parts 46 and 48. The bonding of the strips 35 to the envelope 24 may be by vulcanization. The strips 35 protect the envelope against chafing by the ends 72 and 74.

Referring further to the assembly 10 in FIG. 1, the next step includes providing an annular tube 36 which is of an elastic material such as rubber, natural or synthetic, and which is expandible by being inflated with a gas under pressure, such as air, through a one-way valve 38. The tube 36 fits into the annular cavity 40 defined inside the envelope 24 which lines the internal surface 42 of the tire casing 12.

Referring still further to FIG. 1, the final stage of forming the assembly 10 is the fitting of a rim 44 comprising two detachable rim parts 46 and 48. The rim 44 will be described in more detail with reference to FIG. 3. It is fitted by inserting the rim part 46 into the opening defined by the bead 16, and inserting the part 48 through the opening defined by the bead 18, and then locking the two rim parts 46 and 48 to one another. Thereby the tube 36 is confined in the cavity 40 between the envelope 24 and the rim 44. During the fitting of the rim parts 46 and 48, the valve 38 is inserted through an opening 50 which is provided through the rim part 48. Thereby it is accessible from outside in order to be inflated.

Figure 2:
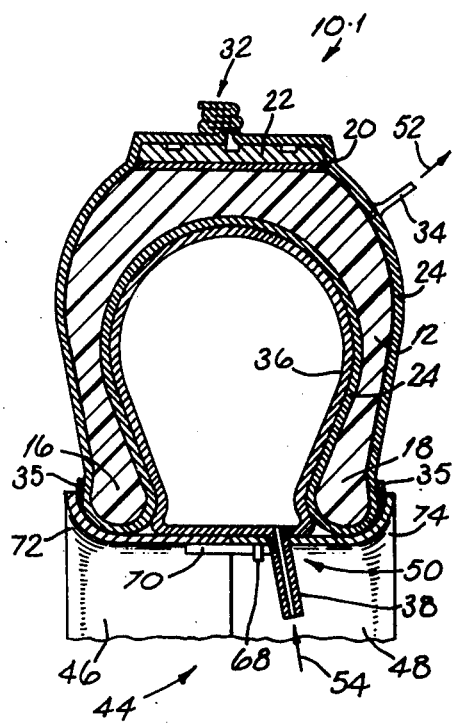
FIG. 2 shows a cross-sectional view, similar to that shown in FIG. 1, of a more advanced stage of the assembly and use of the apparatus shown in FIG. 1.

FIG. 2 shows a more advanced stage of the method of retreading. During this stage air is sucked out in the direction of arrow 52 from the space between the envelope 24 and the internal and external surfaces of the tire casing and tread assembly 12 and 22. With continued sucking out of the air, atmospheric pressure forces the envelope 24 against the tire casing and tread combination 12 and 22 so that the envelope assumes a position continguous with the internal and external surfaces of the assembly. Thereby the tread 22 is forced against the bonding material 20 on the tread zone 14 of the tire casing 12.

The tube 36 is now inflated with air under pressure so that it expands against and abuts the envelope 24 lining the internal surface of the tire casing 12. It is inflated until the pressure inside the tube 36 reaches about 85 p.s.i. The arrow 52 indicates diagrammatically that air under pressure is forced into the tube 36 via the valve 38. The operative assembly shown in FIG. 2 is indicated by reference numeral 10.1.

Referring further to FIG. 2, the inflation of the tube 36 to a pressure of about 85 p.s.i. (5,984 kg/cm$^2$) causes the tire casing 12 to stretch so that the tire casing is therefore in tension while the pressure inside the tube 36 is maintained.

Figure 4:
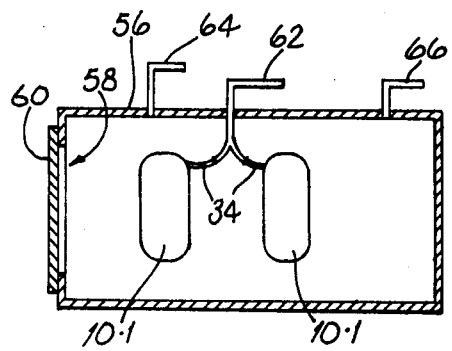
FIG. 4 shows diagrammatically a cross-sectional view of a pressure vessel containing a number of assemblies as shown in FIG. 2.

FIG. 4 shows diagrammatically the final stage in the method of retreading. During this stage several of the assemblies 10.1 shown in FIG. 2 are placed inside a pressure vessel 56 having an access opening 58 which can be closed by means of a cover plate 60. The valve 38 on the envelopes 24 are connected to a suction pipe 62 outside the pressure vessel 56. The assemblies 10.1 as described with reference to FIG. 2 are in a stressed condition due to the air pressure of about 85 p.s.i. (5,984 kg/cm$^2$) inside the tube 36. The assemblies are placed in this stressed condition inside the pressure vessel 56 at ambient temperature. Air under pressure is now forced into the pressure vessel 56 via the inlet 64 until the pressure inside the vessel is about 85 p.s.i. (5,984 kg/cm$^2$). Thus the pressure on the assemblies 10.1 will be about 85 p.s.i. (5,984 kg/cm$^2$). Steam is now injected via the inlet 66 into the pressure vessel 56 to raise the temperature of the air under pressure inside the vessel 56 to about 95°–100° C. This increased temperature also increases the temperature of the air under pressure inside the tube 36 and causes the pressure inside the tube to increase to about 90–100 p.s.i. (6,336–7,04 kg/cm$^2$).

The pressure inside the tube 36 inside the assemblies 10.1 which is about 90–100 p.s.i. (6,336–7,04 kg/cm$^2$) is therefore higher than the pressure of about 85 p.s.i. (5,984 kg/cm$^2$) inside the pressure vessel 56 acting on the outside of the assemblies 10.1. This pressure difference ensures that the tire casing 12 is maintained in tension while the vulcanization of the tread 22 and the bonding material 20 takes place due to the ambient pressure and temperature inside the vessel 56. The pressure difference and the temperature are maintained for about 1½ to 2 hours.

By maintaining a higher pressure inside the tube 36 than outside the envelope 24, it is ensured that the tire casing 12 is slightly expanded and in tension while the pressure difference is maintained. The tread 22, on the other hand, is in an unstressed condition while this pressure difference is maintained and is thus bonded to the tire casing 12 in an unstressed condition while the tire casing itself is in an expanded tensioned condition. Thus the tread 22 is bonded to the tire casing 12 while the tire casing is expanded and tensioned to about the same degree as it would be under normal operating conditions. Consequently, the effect will be that under normal operating conditions the tire casing 12 will be slightly expanded and tensioned due to internal air pressure, while there will be little or no stress in the tread 22. This feature is particularly advantageous when the tire casing 12 are large, such as for tractor and earth moving tires which have a tread region 14 of substantial width, thus requiring treads 22 of substantial width. If the process of the invention is not adopted, the treads 22 would normally be in substantial tension under normal operating conditions when the tire casing 12 is inflated. Tension is the tread 22 in these circumstances is disadvantageous.

Figure 3:
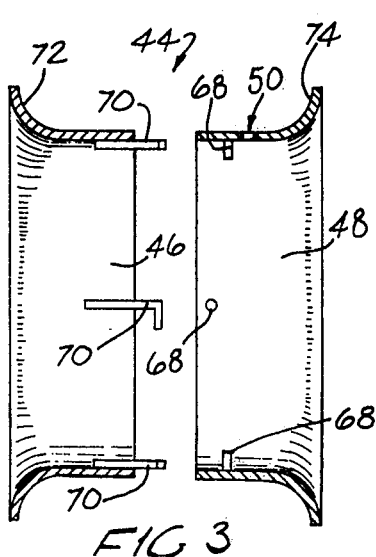
FIG. 3 shows a side view, partly in section, of the composite rim shown in FIG. 1.

Referring now to FIG. 3, the rim 44 comprising the parts 46 and 48 is shown in more detail. The parts are identical and of the same diameter and abut one another flushed when locked together. The part 48 has studs 68 circumferentially spaced along the inside of its bore, while the rim part 46 has hook formations 70 of corresponding circumferential spacings. The hook formation 70 can engage the studs 68 by relative rotation of the rim parts to thereby lock the rim parts to one another as shown in FIG. 2. The rim parts 46 and 48 have flared ends 72 and 74 respectively forming shoulders for engaging and axially restraining the bead regions 16 and 18 of the assembly 10.1 as shown in FIG. 2.

Figure 5:
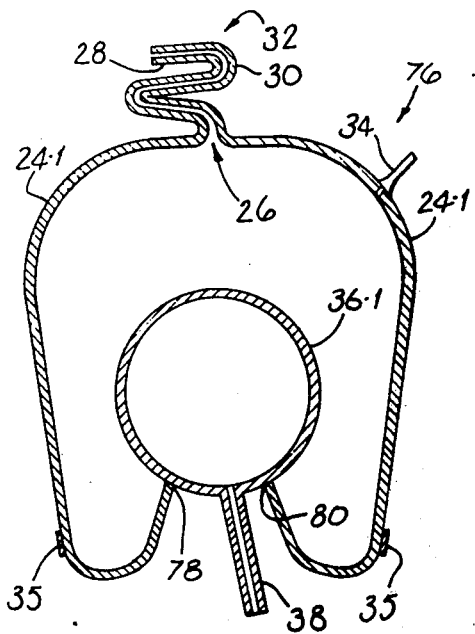
FIG. 5 shows a cross-sectinal view of an alternative form of flexible envelope to that shown in FIG. 1.

Referring to FIG. 5, there is shown in cross-section a member indicated generally by 76. The member 76 comprises two parts 24.1 and one part 36.1 corresponding respectively to the envelope 24 and the tube 36 in FIG. 1, and the member 76 is thus a combination of the envelope 24 and the tube 36. The parts 24.1 are bonded, e.g., by vulcanization at 78 and 80 to the part 36.1. The items 26, 28, 30, 32, 35 and 38 are the same as the identically numbered parts in FIG. 1.

Figure 6:
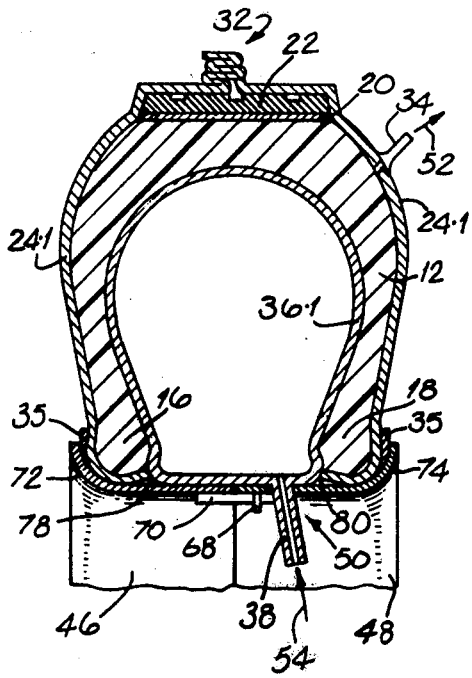
FIG. 6 shows a view similar to FIG. 2 but including the flexible envelope shown in FIG. 5.

FIG. 6 shows the member 76 in use. The envelope parts 24.1 are opened away from one another and a tire casing 12 is inserted between the envelope parts so that the part 36.1 is located in the annular cavity defined in the tire casing. The bonding material 20 and the new tread 22 are applied to the tyre casing and the parts 28 and 30 are interfolded to form a seal 32. The tire casing 12 enclosed in the member 76 is positioned on the rim parts 46 and 48 which are then locked together. The part 36.1 is inflated and thereafter the procedure is exactly the same as described with reference to the embodiment 10.1 in FIG. 2.

Due to the fact that the member 76 is a combination of the parts 24 and 36, there is only one membrane, i.e., 36.1, along the internal surface of the tire casing 12, as shown in FIG. 6, instead of two membranes 24 and 36 as shown in FIG. 2.

Figure 7:
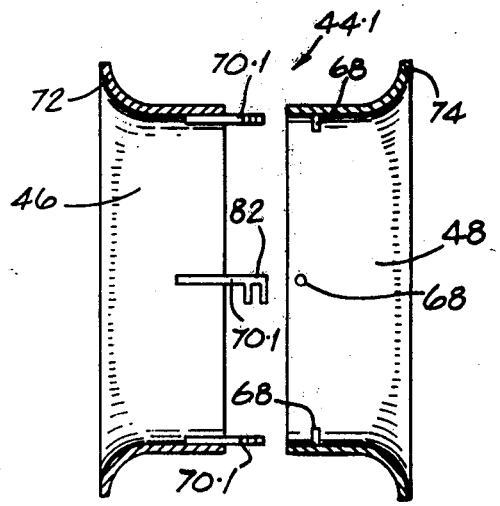
FIG. 7 shows a cross-sectional view of a composite rim similar to that shown in FIG. 3.

FIG. 7 shows a composite rim 44.1 similar to the composite rim 44 shown in FIG. 3. It also comprises two parts 46 and 48 which are axially releasably lockable together by means interlockable formations 68 and 70.1. The formations 68 are studs on the rim part 48 while the formations 70.1 are hooks having forced heads 82 engageable with the studs 68. The arrangement is such that when the studs 68 are engaged in the forked heads 82, the rim parts 46 and 48 are locked together with an axial gap 84 defined between them as shown in dotted lines by 86 in FIG. 8.

Referring to FIG. 8, there is shown a tire casing 12, tread 22 and bonding material 20 enclosed in an envelope 24, exactly as in FIG. 1, and positioned on the rim 44.1 shown in FIG. 7. There is no expandable tube 36 inside the annular cavity 40. The locking formations 68 and 70.1 of the rim 44.1 shown in FIG. 7 have been omitted from FIG. 8.

A valve 88 fits sealingly in an aperture 90 in the rim part 48 and permits air under pressure to be forced into the annular cavity 40. The bead regions 16 and 18 of the tire casing 12 with the envelope 24 around them engage the rim parts 46 and 48 in a fluid tight manner.

A seal 92 is provided to seal the axial gap 84 between the rim parts 46 and 48 in a fluid tight manner from the annular cavity 40. The seal 92 is of an elastic material such as rubber or a suitable synthetic plastics material and it has a cross-sectional profile of H-shape defining recesses 94 and 96 in which the rim parts 46 and 48 are receivable in a fluid tight manner.

When the parts have been assembled as shown in FIG. 8, the envelope 24 is forced against the tire casing 12 and the tread 22 by sucking out air via the valve 34 as shown by arrow 52. The annular cavity 40 is pressurized by forcing air under pressure in the direction of arrow 54 through the valve 88 into the cavity 40. Thereby the cavity is pressurized and the tire casing 12 stressed without the use of a tube 36 as shown in FIG. 1. The seal 92 provides a fluid tight seal against the loss of fluid pressure via the spacing 84 between the rim parts 46 and 48.

Apart from the different method of pressurizing the annular cavity 40, the method of operation of the apparatus shown in FIG. 8 is identical to the method described with reference to FIG. 2.

FIG. 9 shows a side view of the seal 92 which is shown in cross-section in FIG. 8.

FIG. 10 shows in greater detail and on an enlarged scale a fragmentary view of the seal 92 shown in FIG. 8. The seal has projecting ridges 98 projecting into the recesses 94 and 96 and which are complementary to and engageable with grooves 100 provided in the rim parts 46 and 48. The ridges engaging the grooves 100 improve the fluid tight sealing contact between the seal 92 and the rim parts 46 and 48.

Figure 12:
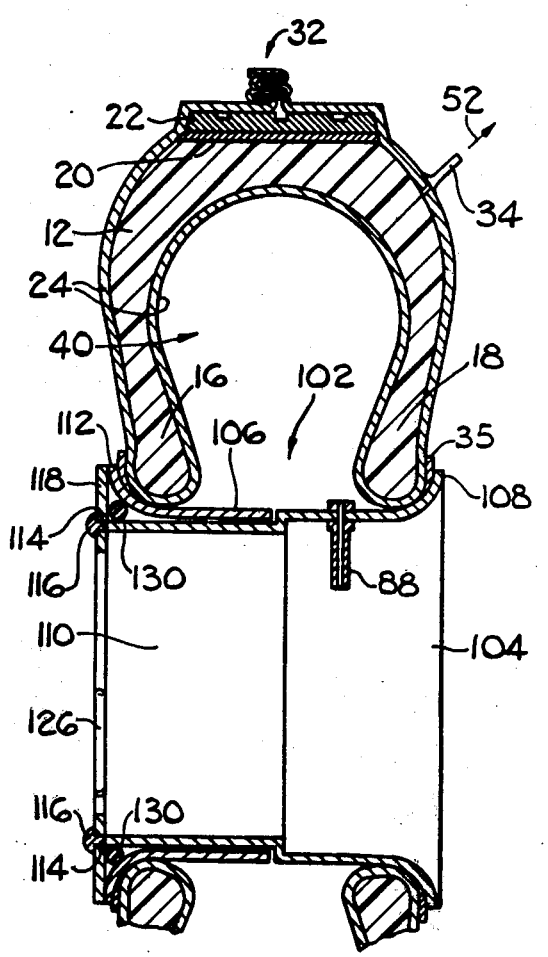
FIG. 12 shows a cross-sectional view on line XII—XII of FIG. 11 and including an envelope and tire casing combination.
Figure 11:
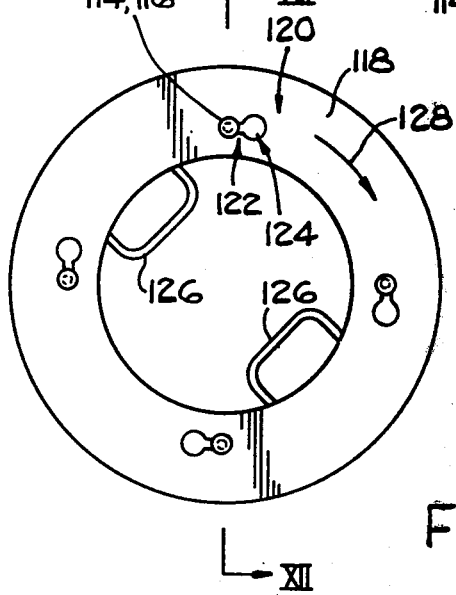
FIG. 11 shows a side view of an apparatus including an alternative rim and sealing arrangement to that shown in FIG. 8 excluding an envelope and tire casing combination.

FIGS. 11 and 12 show a composite rim 102 comprising two detachable parts 104 and 106. The part 104 has a flange 108 and a radially inwardly stepped part 110. A valve 88 identical to that shown in FIG. 8 extends through the rim part 104. The rim part 106 fits over the stepped region 110 of the rim part 104 and has a flange 112 similar to the flange 108.

There are provided a series, for example four as shown in FIG. 11, of spaced studs 114 fast with the axially directed end of the stepped rim part 110. Each stud 114 has a head 116. A metal, e.g., steel ring 118 is provided for locking the rim parts 104 and 106 together. The ring 118 has a plurality of elongate apertures 120 in positions corresponding to the studs 114. Each aperture 120 has a narrow region 122 which is marginally larger than the stud 114, and a larger region 124 which is larger than the stud head 116. The ring 118 is further provided with two handles 126. In order to fit the ring 118, it is gripped by the handles 126 and manipulated so that the stud heads 116 extend through the enlarged regions 124 of the apertures 120. The ring is then turned in the direction of arrow 128, so that the studs 114 slide into the narrow regions 122 of the apertures 120. Thereby the ring 118 is locked between the stud heads 116 and the stepped region 110 of the rim part 104.

An O-ring seal 130, e.g., of rubber or a similar material is provided between the rim parts 106 and 110 and the ring 118. It has such dimensions that when it is in the position shown in FIG. 12 it is in compression to thereby form a fluid tight seal between the rim parts and the ring.

In use, before the rim parts are assembled, a tire casing 12, a tread 22 and bonding material 20, enclosed in an envelope 24 exactly as in FIG. 8, are positioned on the rim part 104 to abut the strip 35 and the flange 108. The rim part 106 is now slid axially over the rim part 110 until the flange 112 abuts the strip 35 on the envelope 24. The sealing ring 130 is now positioned between the rim parts 106 and 110 in the vicinity of the flange 112. The ring 118 is fitted and locked to the stepped rim part 110 via the studs 114 and stud head 116 seating in the apertures 120 and by turning the ring in the direction of arrow 128.

The annular cavity 40 is now pressurized by forcing air under pressure in the direction of arrow 54 through the valve 88 into the cavity 40, as in the arrangement shown in FIG. 8. Thereby the cavity 40 is also pressurized and the tire casing 12 stressed without the use of an inner tube 36 as shown in FIG. 1. The seal 130 provides a fluid tight seal against the loss of air pressure from the cavity 40. By virtue of its position, the seal 131 is forced against the rim parts 106 and 110 and the ring 118 by the air pressure in the cavity 40 and thereby improves the seal. During the pressurization of the cavity 40 the beads 16 and 18 of the tire casing 12 tend to be forced away from one another by the pressure. They are retained in position by the flange 108 and 112 which are restrained against axial separation by the ring 118 and the stud heads 116.

The drawings show only one series of studs 114 and stud heads 116 and one series of apertures 120. If desired, however, a further series of similar studs, stud heads and apertures may be provided radially outwardly from the first set and with the studs fast with the flange 112 of the rim part 106. Thereby the ring 118 can be secured to both the rim parts 106 and 110.

I claim:

1. Tire retreading apparatus including a flexible envelope which can totally enclose the assembly of a tire casing and a tread positioned on the tread zone of the tire casing so that the envelope covers the internal and the external surfaces of the assembly, a tubular rim on which a tire casing enclosed in the envelope is locatable so that the tyre is axially restrained on the rim and so that an annular cavity is defined between the rim and the tire casing enclosed in the envelope located on the rim, and an expandible tube which is positionable in the annular cavity and is an annulus of an elastic material and is fast with the flexible envelope and at least a part of the flexible envelope covering the internal surface of the tire casing forming a part of the expandible tube, the expandible tube being expandible by being inflatable by a gas under pressure to thereby pressurize the annular cavity to force the envelope against the internal surface of the tire casing to thereby stress the tire casing.

2. Apparatus according to claim 1, in which the rim is a composite structure comprising two tubular parts which are axially releasably restrained with respect to one another.

3. Apparatus according to claim 2, in which one end of each rim part is flared out and forms a shoulder engageable with the bead region of a tire casing for axial restraint of the tire casing of the rim.

4. Apparatus according to claim 1, in which the rim parts have releasably lockably interengageable formations.

5. Apparatus according to claim 4, in which the formations on one rim part comprise hooks and the formations on the other rim part comprise projecting studs which are engageable by the hooks by relative rotational movement of the rim parts with respect to one another.

6. Apparatus according to claim 4, in which the formations are provided on the interior tubular surfaces of the rim parts.

7. Apparatus according to claim 4, in which the releasably lockably interengageable formations maintain the rim parts with an axial spacing between them when the formations are locked together.

8. Apparatus according to claim 2, which includes a seal which is adapted to seal the joint between the rim parts in a fluid tight manner when they are in an operative position.

9. Apparatus according to claim 8, in which the seal is an annulus of a resilient material and has a cross-sectional profile of H-shape which is engageable with the rim parts.

10. Apparatus according to claim 9, in which the seal and the rim parts have complementary interengageable formations to improve the sealing of the surfaces of contact between the rim parts and the seal.

11. Apparatus according to claim 1, in which the flexible envelope is strengthened in the region where it contacts the marginal axial regions of the rim.

12. Apparatus according to claim 11, in which the envelope is strengthened by means of a strip of material which is adhesively secured to the envelope.

13. Apparatus according to claim 12, in which the strip of material is reinforced.

14. Apparatus according to claim 3, in which the one rim part fits axially over a part of the other rim part and the rim parts are axially restrained with respect to one another by means of a ring which is releasably attachable to one of the rim parts.

* * * * *

UNITED STATES PATENT AND TRADEMARK OFFICE
CERTIFICATE OF CORRECTION

PATENT NO. : 4,129,474
DATED : December 12, 1978
INVENTOR(S) : AUBREY WILFRED MARTIN It is certified that error appears in the above-identified patent and that said Letters Patent are hereby corrected as shown below:

Col. 3, line 26, after "is" insert: --enclosed in a flexible envelope 24. The envelope 24 is--;

Col. 5, line 18, "flushed" should be --flush--;

Col. 8, line 12, change "claim 1" to --claim 2--.

Signed and Sealed this

Fifteenth Day of May 1979

[SEAL]

Attest:

RUTH C. MASON
Attesting Officer

DONALD W. BANNER
Commissioner of Patents and Trademarks